(12) United States Patent
Glejbol

(10) Patent No.: US 8,960,239 B2
(45) Date of Patent: Feb. 24, 2015

(54) UNBONDED FLEXIBLE PIPE

(75) Inventor: Kristian Glejbol, Glostrup (DK)

(73) Assignee: National Oilwell Varco Denmark I/S, Brondby (DK)

( * ) Notice: Subject to any disclaimer, the term of this patent is extended or adjusted under 35 U.S.C. 154(b) by 138 days.

(21) Appl. No.: 13/809,704

(22) PCT Filed: Jun. 30, 2011

(86) PCT No.: PCT/DK2011/050254
§ 371 (c)(1),
(2), (4) Date: Jan. 11, 2013

(87) PCT Pub. No.: WO2012/006998
PCT Pub. Date: Jan. 19, 2012

(65) Prior Publication Data
US 2013/0112308 A1 May 9, 2013

(30) Foreign Application Priority Data

Jul. 14, 2010 (DK) .................................. 2010 00628

(51) Int. Cl.
*F16L 11/00* (2006.01)
*F16L 11/08* (2006.01)
*E21B 17/01* (2006.01)

(52) U.S. Cl.
CPC ............... *F16L 11/00* (2013.01); *F16L 11/083* (2013.01); *E21B 17/01* (2013.01)
USPC ........................... 138/137; 138/134; 138/138

(58) Field of Classification Search
USPC .................... 138/134–135, 138–139
See application file for complete search history.

(56) References Cited

U.S. PATENT DOCUMENTS

| 3,311,133 A | 3/1967 | Kinander |
| 3,687,169 A | 8/1972 | Reynard |

(Continued)

FOREIGN PATENT DOCUMENTS

| GB | 1227137 A | 4/1971 |
| GB | 1404394 A | 8/1975 |

(Continued)

OTHER PUBLICATIONS

"Specification for Unbonded Flexible Pipe"; API Specification 17J; Second Edition; American Petroleum Institute, API; Jul. 1, 2000.

(Continued)

*Primary Examiner* — Frederick C Nicolas
(74) *Attorney, Agent, or Firm* — Pearne & Gordon LLP

(57) ABSTRACT

An unbonded flexible pipe with a length and a center axis along its length includes an internal sealing sheath surrounding the center axis, and at least two tensile armor layers having cross wound elements surrounding the internal sealing sheath. The two tensile armor layers include a first tensile armoring layer having a plurality of first helically wound, elongate armoring elements, and a second tensile armoring layer having a plurality of second helically wound, elongate armoring elements. The first helically wound, elongate armoring elements consist of a first material or a first combination of materials and the second helically wound, elongate armoring elements consist of a second material or a second combination of materials, where the first material or the first combination of materials is different from the second material or the second combination of materials. The unbonded flexible pipe further includes a galvanic barrier layer between the first and the second tensile armoring layer.

28 Claims, 3 Drawing Sheets

(56) References Cited

U.S. PATENT DOCUMENTS

| | | |
|---|---|---|
| 3,858,616 A | 1/1975 | Thiery et al. |
| 4,343,333 A | 8/1982 | Keister |
| 4,549,581 A | 10/1985 | Unno et al. |
| 4,706,713 A | 11/1987 | Sadamitsu et al. |
| 5,213,637 A | 5/1993 | Mallen Herrero et al. |
| 5,407,744 A | 4/1995 | Mallen Herrero et al. |
| 5,601,893 A | 2/1997 | Strassel et al. |
| 5,645,109 A | 7/1997 | Herrero et al. |
| 5,669,420 A | 9/1997 | Herrero et al. |
| 5,730,188 A | 3/1998 | Kalman et al. |
| 5,813,439 A | 9/1998 | Herrero et al. |
| 5,837,083 A | 11/1998 | Booth |
| 5,922,149 A | 7/1999 | Mallen Herrero et al. |
| 6,016,847 A | 1/2000 | Jung et al. |
| 6,065,501 A | 5/2000 | Feret et al. |
| 6,085,799 A | 7/2000 | Kodaissi et al. |
| 6,123,114 A | 9/2000 | Seguin et al. |
| 6,145,546 A | 11/2000 | Hardy et al. |
| 6,192,941 B1 | 2/2001 | Mallen-Herrero et al. |
| 6,253,793 B1 | 7/2001 | Dupoiron et al. |
| 6,283,161 B1 | 9/2001 | Feret et al. |
| 6,291,079 B1 | 9/2001 | Mallen Herrero et al. |
| 6,354,333 B1 | 3/2002 | Dupoiron et al. |
| 6,382,681 B1 | 5/2002 | Berton et al. |
| 6,390,141 B1 | 5/2002 | Fisher et al. |
| 6,408,891 B1 | 6/2002 | Jung et al. |
| 6,415,825 B1 | 7/2002 | Dupoiron et al. |
| 6,454,897 B1 | 9/2002 | Morand |
| 6,516,833 B1 | 2/2003 | Witz et al. |
| 6,668,867 B2 | 12/2003 | Espinasse et al. |
| 6,691,743 B2 | 2/2004 | Espinasse |
| 6,739,355 B2 | 5/2004 | Glejbol et al. |
| 6,840,286 B2 | 1/2005 | Espinasse et al. |
| 6,889,717 B2 | 5/2005 | Coutarel et al. |
| 6,889,718 B2 | 5/2005 | Glejbol et al. |
| 6,904,939 B2 | 6/2005 | Jung et al. |
| 6,978,806 B2 | 12/2005 | Glejbol et al. |
| 6,981,526 B2 | 1/2006 | Glejbol et al. |
| 7,032,623 B2 | 4/2006 | Averbuch et al. |
| 7,311,123 B2 | 12/2007 | Espinasse et al. |
| 7,487,803 B2 | 2/2009 | Lokere et al. |
| 7,530,372 B2 * | 5/2009 | Gerez et al. .................. 138/134 |
| 2003/0102044 A1 | 6/2003 | Coutarel et al. |
| 2005/0067034 A1 | 3/2005 | Thomson |
| 2013/0112307 A1 * | 5/2013 | Glejbol ........................ 138/137 |
| 2013/0340877 A1 * | 12/2013 | Kassow et al. ................ 138/137 |
| 2014/0076450 A1 * | 3/2014 | Glejbol ....................... 138/118.1 |

FOREIGN PATENT DOCUMENTS

| | | |
|---|---|---|
| GB | 1510874 A | 5/1978 |
| WO | 0066927 A1 | 11/2000 |
| WO | 0161232 A1 | 8/2001 |
| WO | 02095281 A1 | 11/2002 |
| WO | 03044414 A1 | 5/2003 |
| WO | 2008025893 A1 | 3/2008 |
| WO | 2008077409 A1 | 7/2008 |
| WO | 2008077410 A1 | 7/2008 |
| WO | 2009024156 A2 | 2/2009 |

OTHER PUBLICATIONS

"Recommended Practice for Flexible Pipe"; API Recommended Practice 17B; Third Edition; American Petroleum Institute, API; Mar. 2002.

* cited by examiner

UNBONDED FLEXIBLE PIPE

TECHNICAL FIELD

The invention relates to an unbonded flexible pipe in particular for transportation of hydrocarbons and/or water and/or for an umbilical.

BACKGROUND ART

Unbonded flexible pipes of the present type are well known in the art in particular for offshore transportation of fluids. Such pipes usually comprise an inner liner often referred to as an inner sealing sheath or an inner sheath, which forms a barrier against the outflow of the fluid which is conveyed through the pipe, and one or more armoring layers on the outer side of the inner liner (outer armoring layer(s)). An outer sheath may be provided with the object of providing a mechanical protection and/or for forming a barrier against the ingress of fluids from the pipe surroundings to the armoring layers.

Typical unbonded flexible pipes are e.g. disclosed in WO 0161232A1, U.S. Pat. No. 6,123,114 and U.S. Pat. No. 6,085, 799.

As used in this text the term "unbonded" means that at least two of the layers including the armoring layers and polymer layers are not bonded to each other. In practice the known pipe normally comprises at least two armoring layers located outside the inner sealing sheath. In the prior art unbonded pipes, the armoring layers are not bonded to each other or to other layers directly or indirectly via other layers along the pipe. The pipe layers can therefore move relative to each other, and thereby the pipe becomes highly bendable, usable for dynamic applications e.g. as risers, and sufficiently flexible to roll up for transportation even when the layers are relatively thick, which is necessary for high strength pipes which should be able to withstand high pressure differences over layers of the pipe e.g. pipe differences between the pressure inside the bore of the pipe and the pressure on the outer side of the pipe.

In order to have sufficient strength, in particular to prevent the collapse of the inner sealing sheath, the unbonded flexible pipe often comprises an armoring layer located inside the space defined by the inner sealing sheath. Such inner armoring layer or layers are normally referred to as a carcass. Such carcass is usually of metal, such as steel, and is for example provided by helical winding of one or more elongate metal elements, which elongate element or elements may be interlocked to each other and/or to itself in consecutive windings thereof.

In the standard usually applied for unbonded flexible pipe API specification 17 J "Specification for unbonded flexible pipe", second edition, published by American Petroleum Institute, and "Recommended Practice for Flexible Pipe" Third edition published by American Petroleum Institute additional information on the general state of the art of unbonded flexible pipes can be found.

Unbonded flexible pipes can be very long, and since the production of oil is performed at increasing deeper waters the length as well as the requirement to strength of the unbonded flexible pipe is increased as well. A main reason for the increased requirement is that the deeper a flexible pipe is to be used, the higher will the requirement be to strength against collapsing due to external pressure. Further more the weight of the pipe during deployment may result in high tensile forces which increase with the length of the pipe and the depth of the deployment site. In other words, the higher strength that needs to be provided the higher the weight of the pipe will be and the higher weight the more difficult and potential damaging transportation and deployment: In practice deployment of a too heavy flexible pipe is impossibly since the flexible pipe will be torn apart before the flexible pipe has been final installed, in particular in situations where the flexible pipe is a riser pipe for transporting fluids in vertical direction e.g. from seabed to a sea surface installation such as a ship or a platform. However, also for the deployment of flow lines the heavy weight of the unbonded flexible pipe can be a major problem.

In order to decrease the weight of the unbonded flexible pipe it has been suggest to replace the metal armoring with armoring of composite materials e.g. as described in WO 00/66927 and WO 02/095281.

Furthermore, flexible unbonded pipes are often used in highly chemically aggressive environments, which for many applications will require that the reinforcement layers are provided in a highly corrosive resistant and strong material, which so far has only been met with flexible unbounded pipes comprising steel reinforcement layers of high and rather expensive quality or with increased thickness or number of reinforcement layers which also result in an undesired increased weight of the pipe.

The object of the invention is to provide an unbonded flexible pipe which has sufficient long term strength while still is optimized with respect to weight profile and cost.

The unbonded flexible pipe of the invention is as defined in the claims. Additional beneficial solutions which may have additional advantages are defined in the dependent claims and are described in the following.

The unbonded flexible pipe of the invention has a length and a center axis along the length.

The unbonded flexible pipe comprises an internal sealing sheath (sometimes called an inner liner) which forms the bore of the pipe, i.e. the area inside the internal sealing sheath is the bore of the pipe.

The flexible unbonded pipe comprises at least two tensile armor layers comprising cross wound elements surrounding the internal sealing sheath. The at least two tensile armor layers comprise a first and a second tensile armoring layer. The first tensile armoring layer comprises a plurality of first helically wound, elongate armoring elements, and the second tensile armoring layer comprises a plurality of second helically wound, elongate armoring elements. The first helically wound, elongate armoring elements consist of a first material or a first combination of materials and the second helically wound, elongate armoring elements consist of a second material or a second combination of materials, where the first material or the first combination of materials is different from the second material or the second combination of materials. The unbonded flexible pipe further comprises a galvanic barrier layer between the first and the second tensile armoring layer.

In the following the term "length of the unbonded flexible pipe" is used to mean the length along the axis of the unbonded flexible pipe. The internal sealing sheath is the innermost liquid impermeable sheath which has the purpose of essentially preventing a fluid e.g. a liquid, a gas or a combination of liquid and gas transported in the unbonded flexible pipe from flowing out of the unbonded flexible pipe. Minor amounts of gasses will usually migrate through the internal sealing sheath in dependence of the composition of the fluid transported, the temperature and the pressure difference over the internal sealing sheath. The internal sealing sheath may be a one-layered sheath or it may be a multi-layered bonded sheath comprising one or more polymer layers. In one embodiment the internal sealing sheath is a multi-layered partly non-bonded sheath comprising a plurality of polymer layers where at least two layers have an interfacial non-bonded contact area where they are in contact with each other but not bonded to each other in at least some areas where they are in contact with each other. In an embodiment comprising such interfacial non-bonded contact area the barrier properties of the at least two layers should preferably be such that the innermost polymer layer provides a higher barrier against migration of gas such as methane, hydrogen sulphides, carbon dioxides and water, than the polymer layer or layers of the internal sealing sheath outside of the innermost layer of the internal sealing sheath internal sealing sheath. The space inside the inner sealing sheath is also referred to as the bore of the pipe.

In one embodiment an additional liquid impermeable polymer layer is applied onto the internal sealing sheath but without being bonded or partly bonded thereto. In this embodiment the barrier properties of the internal sealing sheath and the liquid impermeable layer applied onto the internal sealing sheath should preferably be such that the internal sealing sheath provides a higher barrier against migration of gas such as methane, hydrogen sulphides, carbon dioxides and water, than the liquid impermeable layer applied onto the internal sealing sheath.

Generally it is desired that the unbonded flexible pipe is substantially circular in cross sectional shape, It should, however, be understood that the flexible pipes could have other cross sectional shapes such as oval, elliptical or slightly angular (angular with rounded edges). The axis of the unbonded flexible pipes may in such situations be determined as the most central axis in the bore of the flexible pipe. The unbonded flexible pipe may e.g. have a maximum to minimum diameter $D_{max}/D_{min}$ from about 1 to about 2, such as up to about 1.5.

The terms "axial direction" or "axially" are used to mean the direction along the length of an axis of the pipe. The term "substantially axial direction" means the direction along the length of an axis of the pipe +/−10 degrees.

The term "winding directions" means helically left turned and helically right turned winding directions of elongate elements where the helically left turned and helically right turned winding directions are also denoted as opposite winding directions.

The term "cross wound" is used to denote elongate elements or layer of elongate elements wound with opposite winding directions irrespectively of the actual winding angle i.e. a first elongate element wound with a first winding direction and a first winding angle will not be cross wound with a second elongate element where this second elongate element is wound with a second angle different from the first winding angle if the second elongate element is wound with the first and same winding direction as the first elongate element; whereas if the second element is wound with a second winding direction different from the first winding direction the first and second elongate elements would be cross wound.

The terms "outside" and "inside" a member and/or a layer are used to mean outside, respectively inside the member and/or a layer in radial direction from, and perpendicular to the axis of the pipe and radially out to an outermost surface of the pipe. The terms "outermost" and "innermost" are also to be understood as in relation to the axis of the pipe.

The terms "tensile armor" and "pressure armor" and "balanced armor" are well recognized terms within the art of flexible pipes. A "tensile armor" means an armor arranged around the pipe to absorb tensile forces, i.e. forces acting in axial direction. A "pressure armor" means an armor arranged around the pipe to mainly absorb pressure forces i.e. forces acting in radial direction. A "balanced armor" is an armor which is arranged to absorb both tensile forces and pressure forces. Usually a "balanced armor" is an armor within the group of tensile armors.

Tensile armors can for example be helically wound elongate armoring elements with winding angles with respect to the center axis of from about 25 to about 55 degrees, such as a winding angle of from about 25 degrees to about 40 degrees relative to the center axis of the pipe.

The terms "armoring element" and "reinforcement element" are used interchangeable. The terms "armoring layer" and "reinforcement layer" are used interchangeable.

The term "unbonded" is as defined in the introductory part of the description. Preferably at least two outer armoring layers are non-bonded with respect to each other.

The term "bonded" is used herein to mean fixed to each other over substantially the whole area where the bonded layers are in contact with each other. The terms "partly bonded" and "partly unbonded" are used interchangeably and are used herein to mean fixed to each other over a part of the area where the bonded layers are in contact with each other. A multi-layered sheath which is partly bonded may accordingly comprise a plurality of polymer layers where at least two layers comprise an interfacial non-bonded contact area where they are in contact with each other but not bonded to each other.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

The unbonded flexible pipe of the invention has shown to have an improved balance of the combined properties of a high strength, a low weight and high resistance against undesired corrosion. Due to the present invention it is now possible to provide an unbonded flexible pipe with an improved strength to weight profile, for example such that an unbonded flexible pipe with a given required minimum strength can be provided with a lower weight compared to prior art unbonded flexible pipes.

As mentioned above the weight of the unbonded flexible pipe sets a limit for the depth to which the pipe can be deployed, because the uppermost part of the pipe will be subjected to a tearing force by the weight of the piper below this uppermost part, which ultimately will result in damaging of the pipe in case the weight of the piper below this uppermost part is too high and/or the strength of the pipe is too low to withstand the tearing force. By optimizing the weight to strength profile according to the invention it will accordingly provide new possibilities for increasing the length of the unbonded flexible pipes and the depth to which they can be deployed.

Furthermore the risk of undesired corrosion due to the use of different material or material combinations of the first and the second tensile armoring layers has been highly reduced or even avoided by providing a galvanic barrier layer between these two tensile armoring layers. Thereby the long time strength of the unbonded flexible pipe can be ensured and in particular it can be ensured that the strength of metal parts of the tensile armoring layers follows well known strength profiles and that the strength profile of the unbonded flexible pipe over time, such as over 20 years which is the normal expected lifetime of an unbonded flexible pipe, can be estimated with a desired security margin.

For providing a desired galvanic barrier it is generally desired that liquid cannot flow through the galvanic barrier layer and preferably the galvanic barrier layer is substantially impermeable to liquid e.g. such that merely insignificant amount of liquid passes over the galvanic barrier layer when the unbonded flexible pipe is in use.

In one embodiment the galvanic barrier layer is impermeable to liquid for pressure differences over the galvanic barrier layer up to about 10 kPa, such as up to about 100 kPa, such as up to about 200 kPa, such as up to about 400 kPa, such as up to about 800 kPa, such as up to about 1000 kPa. A test for this property can be performed by applying a sample of the galvanic barrier layer in a test equipment and subjecting it to the selected pressure difference with Copenhagen water on its high pressure size for 24 hours.

Copenhagen water, also referred to as "normal water" is a standard seawater with a chlorinity of between 19.30 and 19.50 grams per kilogram (or per mille) and has been determined to within ±0.001 per mille.

Normal water is prepared by the Hydrographical Laboratories, Copenhagen, Denmark.

The galvanic barrier layer is preferably based on polymer as described further below. Generally all polymer materials are permeable to gas under certain circumstances. The gas permeability depends in particularly on the temperature, pressure/pressure difference over a polymer layer, and the type of gas and the partial pressure of the gas in question.

In one embodiment the galvanic barrier layer provides a fluid permeation barrier against one or more of the fluids methane, ethane, hydrogen sulphide, carbon dioxide and water, which is at least as high as a fluid permeation barrier against the one or more of the fluids methane, hydrogen sulphides, carbon dioxides and water provided by the internal sealing sheath determined at 50° C. and a pressure difference over the galvanic barrier layer of 1000 kPa.

A test for this property can be performed by applying a sample of the galvanic barrier layer in a test equipment and subjecting it to the selected pressure difference of the fluid in question for 24 hours and comparing the result with a similar determination of a sample of the internal sealing sheath. The pressure difference should be maintained during the test.

In one embodiment the galvanic barrier layer provides a fluid permeation barrier against water, which is at least as high as a fluid permeation barrier against water provided by the internal sealing sheath determined at 50° C. and a pressure difference over the galvanic barrier layer of 1000 kPa.

In one embodiment the galvanic barrier layer has a gas permeability against one or more of the fluids methane, ethane, hydrogen sulphide and carbon dioxide, which is at least as high as a the gas permeability of one or more of the fluids methane, hydrogen sulphides and carbon dioxides provided by the internal sealing sheath determined at 50° C. and a pressure difference over the galvanic barrier layer of 1000 kPa.

In this embodiment where the aggressive gasses which passes from the bore of the unbonded flexible pipe to the first tensile armoring layer will not be accumulated between the internal sealing sheath and the galvanic barrier layer because the permeability for the gas in question of the galvanic barrier layer is at least as high as the permeability of the gas through the internal sealing sheath. Simultaneously the galvanic barrier layer prevents liquid and preferably water flow, i.e. it prevents a galvanic transfer between the first and the second tensile armoring layer.

In one embodiment the galvanic barrier layer provides a liquid barrier against inflow of water, i.e. the galvanic barrier layer is substantially liquid impermeable and prevent water from flowing into contact with the tensile armoring layer innermost to the galvanic barrier layer. The galvanic barrier layer may simultaneously be sufficiently gas permeable to allow gas that has passed from the bore to pass further through the galvanic barrier layer to thereby avoid accumulation of gasses between the internal sealing sheath and the galvanic barrier layer.

In one embodiment the galvanic barrier layer is essentially impermeable to H2O at 50° C. and a pressure difference over the galvanic barrier layer of 1000 kPa.

In one embodiment the galvanic barrier layer is essentially impermeable to one or more of the fluids hydrogen sulphide, methane and carbon dioxide, at a partial pressure for the respective fluids on a first side of the layer of 3 kPa or more, such as 10 kPa or more, such as 100 kPa or more, such as 1000 kPa or more, the partial pressure of the one or more of the fluids hydrogen sulphides, methane and carbon dioxide being substantially zero and the determination is performed at 50° C. and a pressure difference over the galvanic barrier layer of 1000 kPa. In this embodiment it may be desired to have a vent for allowing gas that have passed from the bore over the internal sealing sheath to escape so as to avoid accumulation of gasses between the internal sealing sheath and the galvanic barrier layer.

In order to provide a sufficient barrier against galvanic reactions over the galvanic barrier layer, the thickness of the galvanic barrier layer should preferably not be less than about 0.1 mm, such as at least about 0.5 mm. For unbonded flexible pipe which are to be used at deep waters, e.g. such at about 1500 m or deeper, the galvanic barrier layer may preferably have a thickness of as at least about 1 mm, such as at least about 2 mm.

The galvanic barrier layer is preferably an extruded layer. In an alternative embodiment the galvanic barrier layer is a wound or folded layer which in order to provide the necessary galvanic barrier, is wounded or folded with relatively large overlap and optionally bonded in the overlapping areas e.g. provided by a cross-linking activator and electromagnetic waves e.g. a peroxide compound and infrared radiation.

The galvanic barrier layer may in principle be of any material which can provide a sufficient galvanic barrier. In one embodiment the galvanic barrier layer comprises one or more of the materials selected from polyolefins, e.g. polyethylene (e.g. cross linked—PEX) and poly propylene; polyamide, e.g. poly amide-imide, polyamide-11 (PA-11), polyamide-12 (PA-12) and polyamide-6 (PA-6)); polyimide (PI); polyurethanes; polyureas; polyesters; polyacetals; polyethers, e.g. polyether sulphone (PES); polyoxides; polysulfides, e.g. polyphenylene sulphide (PPS); polysulphones, e.g. polyarylsulphone (PAS); polyacrylates; polyethylene terephthalate (PET); polyether-ether-ketones (PEEK); polyvinyls; polyacrylonitrils; polyetherketoneketone (PEKK); copolymers of the preceding; fluorous polymers e.g. polyvinylidene diflouride (PVDF), homopolymers or copolymers of vinylidene fluoride ("VF2"), homopolymers and copolymers of trifluoroethylene ("VF3"), copolymers or terpolymers comprising two or more different members selected from VF2, VF3, chlorotrifluoroethylene, tetrafluoroethylene, hexafluoropropene, and hexafluoroethylene; compounds comprising one or more of the above mentioned polymers, and/or composite materials, such as a polymer (e.g. one of the above mentioned) compound with reinforcement fibers, such as glass-fibers, carbon-fibers and/or aramide fibers.

In one embodiment the galvanic barrier layer is a peroxide containing polyolefin e.g. a polyethylene (PE) such as a high density PE (HDPE), which is wounded or folded with overlap onto a tensile armoring layer, followed by cross linking e.g.

using electromagnetic waves. Information about cross linking using electromagnetic waves can for example be found in EP 1494845.

In one embodiment the galvanic barrier layer is sufficiently thick to substantially prevent galvanic contact between the first and the second tensile armor layer.

The galvanic barrier layer may be in the form of one single layer or it may comprise a plurality of layers preferably bonded totally or partly to each other, where the layers may be equal or different from each other.

In one embodiment the galvanic barrier layer is or comprises a semi-permeable membrane, e.g. a semi-permeable allowing hydrogen sulphide to pass but not water.

In one embodiment the galvanic barrier layer is or comprises a porous diaphragm which permits diffusion of gas, but not mass flow.

In one embodiment the galvanic barrier layer allows gas to flow outwards through the galvanic barrier layer, but prevents mass flow inwards through the galvanic barrier layer.

The galvanic barrier layer is in one embodiment substantially uniform along the length of the unbonded flexible pipe.

In one embodiment the galvanic barrier layer varies gradually or stepwise along the axial direction of the pipe. For example the galvanic barrier layer may in one embodiment have a thickness which is increasing along the length of the pipe, for example such that the deeper the unbonded flexible pipe is adapted to be applied, and according the higher the external hydrostatic pressure will be, the thicker is the galvanic barrier layer.

In one embodiment the galvanic barrier layer is the outermost liquid impermeable layer. In this embodiment the outer side of the galvanic barrier layer will be wetted with sea water when the pipe is submerged, and the hydrostatic pressure will act directly on the galvanic barrier layer. This embodiment has the additional benefit that any aggressive component, such as hydrogen sulphide, which has passed from the bore and through both the internal sealing sheath and the galvanic barrier layer, will immediately be substantially removed by the water from the tensile armoring layer outside the galvanic barrier layer such that this aggressive component does not result in corrosion of the tensile armoring layer outside the galvanic barrier layer. To ensure a durable pipe, the material or materials of the tensile armoring layer outside the galvanic barrier layer should preferably be selected such that it/they is/are substantially not degraded by the water over for example 5, 10 or even 20 years.

In one embodiment the first tensile armoring layer is closer to the internal sealing sheath than the second tensile armoring layer, and accordingly the tensile armoring layer outside the galvanic barrier layer is in this embodiment the second tensile armoring layer.

According to the invention the material or materials for the first helically wound, elongate armoring elements can be selected independently from the selection of material(s) for the second helically wound, elongate armoring elements. Due to the galvanic barrier layer the material(s) of the first and second helically wound, elongate armoring elements will substantially not affect each other, and in particular any galvanic destruction of the materials of one of the tensile armoring layers will not be caused by material(s) of the other one of the tensile armoring layers separated by the galvanic barrier layer.

Heretofore it has never been considered to apply a barrier layer between tensile armoring layers, because the wound tensile armoring layers usually have been considered as one single functional unit. For avoidance of excessive wear a wound fluid permeable anti-wear layer has in some situations been applied between tensile armoring layers of prior art pipes, however it has never been considered to separate tensile armoring layers, so as to subject them to different immediate environment with respect to composition and/or pressure. The term "immediate environment" is here used to denote the area of fluid/gas in contact with the respective tensile armoring layer with a distance to the tensile armoring layer not exceeding 1 cm.

In one embodiment the first helically wound, elongate armoring elements comprise or consist of metal, such as steel, aluminum and/or titanium. In this embodiment the second helically wound, elongate armoring elements may for example consist of or comprise metal and/or polymer. For reducing of weight the second helically wound, elongate armoring elements may preferably be substantially of composite material(s).

In one embodiment the first helically wound, elongate armoring elements comprise or consist of fiber armed composite material, e.g. comprising one or more of the fibers carbon fibres, basalt fibres, glass fibres, aramide fibres and polyethylene fibres. In this embodiment the second helically wound, elongate armoring elements may for example consist of or comprise metal and/or polymer. Also in this embodiment the second helically wound, elongate armoring elements may for low weight reasons be substantially of composite material(s), however for ensuring long term strength it may be beneficial to provide the second helically wound, elongate armoring elements wholly or partly of metal.

In one embodiment the second helically wound, elongate armoring elements comprise or consist of metal, such as steel, aluminum and/or titanium. In this embodiment the first helically wound, elongate armoring elements may for example consist of or comprise metal and/or polymer. For reducing of weight the first helically wound, elongate armoring elements may preferably be substantially of composite material(s).

In one embodiment the second helically wound, elongate armoring elements comprise or consist of fiber armed composite material, e.g. comprising one or more of the fibers carbon fibres, basalt fibres, glass fibres, aramide fibres and polyethylene fibres. In this embodiment the first helically wound, elongate armoring elements may for example consist of or comprise metal and/or polymer. Also in this embodiment the first helically wound, elongate armoring elements may for low weight reasons be substantially of composite material(s), however for ensuring long term strength it may be beneficial to provide the second helically wound, elongate armoring elements wholly or partly of metal.

In one embodiment at least one of the first and second tensile armoring layers comprises helically wound, elongate armoring elements consisting substantially of a composite material and the other one of the first and second tensile armoring layers comprises helically wound, elongate armoring elements consisting substantially of metal. In one embodiment substantially all of the elongate armoring elements of the second tensile armoring layer consisting substantially of a composite material and substantially all of the helically wound, elongate armoring elements of the first tensile armoring layer consisting substantially of metal. The term "substantially" should in this connection be taken to mean that any additional armoring effect provided of additional elements of another material is superfluous.

The one or more of the first and/or second helically wound, elongate armoring elements may in principle have any elongate shape such as the shapes known from prior art elongate armoring elements of unbonded flexible pipes. In one embodiment the one or more of the first and/or second helically wound, elongate armoring elements is/are in the form of tapes, folded strips, and/or wires of metal.

In one embodiment the first and/or second tensile armoring layer comprises helically wound, elongate armoring elements with in between elongate elements of an elastic material, such as rubber. The rubber elements may be provided to ensure that the galvanic barrier layer and/or the internal sealing sheath and/or an outer sealing sheath is not subjected to undesired deformation or damage due to gabs between elongate armoring elements of a tensile armoring layer. Simultaneously the rubber elements may reduce risk of lateral, radial and/or upheaval buckling and/or other deformation damage.

In one embodiment the first helically wound, elongate armoring elements and the second helically wound, elongate armoring elements are cross wound with respect to each other with no additional tensile armoring layer in between. In this embodiment the unbonded flexible pipe may have only these two tensile armoring layers comprising respectively the first helically wound, elongate armoring elements and the second helically wound, elongate armoring elements.

In another embodiment the unbonded flexible pipe comprises an additional tensile armoring layer arranged between the first tensile armoring layer and the second tensile armoring layer such that the additional tensile armoring layer comprises elongate armoring elements with a winding angle with respect to the center axis which is cross wound with the first helically wound, elongate armoring elements or the second helically wound, elongate armoring elements.

It should be understood that the unbonded flexible pipe may comprise several additional tensile armoring layers and that the one or more additional tensile armoring layers may comprise helically wound, elongate armoring elements with any desired winding angle. In one embodiment the winding angles of the respective helically wound, elongate armoring elements are adapted to each other such that the reinforcement strength of helically wound, elongate armoring elements wound in one direction around the pipe corresponds to the reinforcement strength of the helically wound, elongate armoring elements wound in opposite direction around the pipe. In this adaptation the type of materials, thickness of materials and winding angle are taken into consideration.

As mentioned above the first helically wound, elongate armoring elements consist of a first material or a first combination of materials and the second helically wound, elongate armoring elements consist of a second material or a second combination of materials. Due to the difference between the first material or the first combination of materials relative to the second material or the second combination of materials, the galvanic potential will in most situations also be different from each other.

Accordingly, in one embodiment the first helically wound, elongate armoring elements have a first galvanic potential and the second helically wound, elongate armoring elements have a second galvanic potential, wherein the first galvanic potential is different from the second galvanic potential. The galvanic potentials may preferably be determined in Copenhagen water at about 20° C. and substantially no turbulence. However, since the relative galvanic potential is usually not dependant on water and circumstances in which it is determined, other methods may be applied as well for the relative determination.

It has been found that even a small difference in galvanic potential of materials of tensile armoring layers of prior art pipes can have highly damaging long term consequences. The galvanic barrier layer has shown to provide a very effective protecting against such damaging effect and thereby open up for applying combinations of materials for unbonded flexible pipes which has not even been considered prior to the present invention.

In one embodiment the absolute difference between the first galvanic potential and the second galvanic potential is at least about 0.25 V, such as at least about 0.5 V, such as at least about 1 V, determined in Copenhagen water at about 20° C.

In one embodiment the second galvanic potential is higher than the first galvanic potential. The first helically wound, elongate armoring elements may for example be of metal, e.g. steel, even steel with low nickel content and the second helically wound, elongate armoring elements may be of carbon fiber reinforced polymer (CFRP).

In one embodiment the first helically wound, elongate armoring elements have a different resistance to hydrogen cracking than the second helically wound, elongate armoring elements.

The resistance to hydrogen cracking may be determined by ASTM G142-98(2004) Standard Test Method for Determination of Susceptibility of Metals to Embrittlement in Hydrogen Containing Environments at High Pressure, High Temperature, or Both; NACE TM0177-2005 Laboratory Testing of Metals for Resistance to Sulfide Stress Cracking and Stress Corrosion Cracking in H2S Environments; or NACE-TM2003 Evaluation of Pipeline and Pressure Vessel Steels for Resistance to Hydrogen-Induced Cracking.

Hydrogen cracking—sometimes called hydrogen embrittlement—is a process which may occur in metallic materials upon or after exposure to hydrogen under circumstances where hydrogen atoms diffuse into the material. The hydrogen atoms may diffuse into the metal e.g. upon heating, e.g. during welding or when subjected to high pressure. Usually corrosion may also increase the diffusion of hydrogen atoms into the metal. When the hydrogen atoms have diffused into the metal it will re-combine to hydrogen molecules or it may react with carbon to form methane and these hydrogen or methane molecules may increase the pressure in cavities of the metals, which eventually may leas to cracks in the metal. With respect to evaluation of susceptibility of high strength steels to hydrogen cracking, we refer to B. Swieczko-Żurek et al., Journal of Achievements in Materials and Manufacturing Engineering ISSUE 1-2, p. 243-246, September-October 2006.

In one embodiment the first helically wound, elongate armoring elements have a higher resistance to hydrogen cracking than the second helically wound, elongate armoring elements.

The tensile strength of the first and the second helically wound, elongate armoring elements may additionally differ from each other.

In one embodiment first helically wound, elongate armoring elements have a first ultimate tensile strength the second helically wound, elongate armoring elements have a second ultimate tensile strength, the second ultimate tensile strength is exceeding the first ultimate tensile strength, preferably the second ultimate tensile strength is at least about 50 MPa higher than the first ultimate tensile strength.

The ultimate tensile strength (UTS) is the maximum resistance to fracture. It is equivalent to the maximum load that can be carried by one square inch of cross-sectional area when the load is applied as simple tension. The UTS is determined as the maximum load divided by the area of original cross section.

In one embodiment at least one of the first helically wound, elongate armoring elements and/or at least one of the second helically wound, elongate armoring elements comprise a plurality of cords of fibers, preferably at least one of the second helically wound, elongate armoring elements comprises a plurality of cords of fibers.

The cords of fibers may preferably be an integrated part of a composite material. Accordingly, in one embodiment the plurality of cords of fibers are held together by a cured polymer, the cured polymer is optionally applied in a crib e.g. of PE.

In one embodiment at least one of the first helically wound, elongate armoring elements and/or at least one of the second helically wound, elongate armoring elements is/are in the form of a plurality of strength imparting layers held together by a cured polymer, the strength imparting layers are preferably selected from metal foils and/or fibre reinforced polymers, such as fibre reinforced epoxy or fibre reinforced vinylester, the fibre optionally being carbon, glass, basalt or a mixture hereof. An example of such elongate armoring elements is described in WO 02/095281.

In one embodiment at least one of the first helically wound, elongate armoring elements and/or at least one of the second helically wound, elongate armoring elements is/are in the form of a plurality of strength imparting layers bonded to each other with a thermoplastic polymer or a polymer that has been cross-linked after winding to form the tensile armouring layer(s), the strength imparting layers are preferably selected from metal foils and/or thermoset polymer, such as fiber reinforced polymer, such as carbon fiber reinforced polymer (CFRP).

CFRP is a very strong and simple processable composite material which has a very high strength to weight level and which has been found to be a good candidate for use in unbonded flexible pipes, however the very high galvanic potential of the carbon fibers has made it unsuitable for use in contact with metals such as steel. According to the present invention it is now possible to provide an unbonded flexible pipe comprising a tensile armoring of both CFRP and steel.

It should be understood the unbonded flexible pipe may comprise additional layers between the first and the second tensile armor layers such as for examples one or more anti wear layers.

The unbonded flexible pipe of the invention may additionally comprise further layers, such as layers of the types generally known in the art.

In one embodiment the unbonded flexible pipe additionally comprises a pressure armor comprising one or more layers for example of helically wound elongate reinforcement elements having an angle to the center axis of about 70 degrees or more, such as of about 80 degrees or more. The pressure armor layer is preferably arranged between the internal sealing sheath and the tensile armoring layers.

In one embodiment the flexible pipe of the invention may for example be combined with any additional layers selected from the layers of flexible pipes described in any one of the prior art documents GB 1 404 394, U.S. Pat. No. 3,311,133, U.S. Pat. No. 3,687,169, U.S. Pat. No. 3,858,616, U.S. Pat. No. 4,549,581, U.S. Pat. No. 4,706,713, U.S. Pat. No. 5,213,637, U.S. Pat. No. 5,407,744, U.S. Pat. No. 5,601,893, U.S. Pat. No. 5,645,109, U.S. Pat. No. 5,669,420, U.S. Pat. No. 5,730,188, U.S. Pat. No. 5,730,188, U.S. Pat. No. 5,813,439, U.S. Pat. No. 5,837,083, U.S. Pat. No. 5,922,149, U.S. Pat. No. 6,016,847, U.S. Pat. No. 6,065,501, U.S. Pat. No. 6,145,546, U.S. Pat. No. 6,192,941, U.S. Pat. No. 6,253,793, U.S. Pat. No. 6,283,161, U.S. Pat. No. 6,291,079, U.S. Pat. No. 6,354,333, U.S. Pat. No. 6,382,681, U.S. Pat. No. 6,390,141, U.S. Pat. No. 6,408,891, U.S. Pat. No. 6,415,825, U.S. Pat. No. 6,454,897, U.S. Pat. No. 6,516,833, U.S. Pat. No. 6,668,867, U.S. Pat. No. 6,691,743, U.S. Pat. No. 6,739,355 U.S. Pat. No. 6,840,286, U.S. Pat. No. 6,889,717, U.S. Pat. No. 6,889,718, U.S. Pat. No. 6,904,939, U.S. Pat. No. 6,978,806, U.S. Pat. No. 6,981,526, U.S. Pat. No. 7,032,623, U.S. Pat. No. 7,311,123, U.S. Pat. No. 7,487,803, US 23102044, WO 28025893, WO 2009024156, WO 2008077410 and WO 2008077409.

In one embodiment the unbonded flexible pipe further comprises an outer sheath for mechanical and/or chemical protection, the outer sheath being the outermost polymer sheath, and the outer sheath is permeable or impermeable to liquid.

In one embodiment the unbonded flexible pipe further comprises one or more additional layers such as one or more of the layers an intermediate polymer layer, an anti-wear layer, a thermal insulating layer an outer sheath for mechanical and/or chemical protection and a carcass for reinforcement against collapse.

In one embodiment the unbonded flexible pipe of the invention comprises a carcass arranged inside the internal sealing sheath.

In one embodiment the unbonded flexible pipe further comprises one or more sensors e.g. comprising an optical fiber.

In one embodiment the unbonded flexible pipe is a riser.

In one embodiment the unbonded flexible pipe is a flow line.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

The invention is defined by the features of the independent claim. Preferred embodiments are defined in the dependent claims. Any reference numerals in the claims are intended to be non-limiting for their scope.

BRIEF DESCRIPTION OF DRAWINGS

The invention will be explained more fully below in connection with examples of embodiments of the invention and with reference to the drawings in which.

The figures are schematic and simplified for clarity. Throughout, the same reference numerals are used for identical or corresponding parts.

Figure 1:
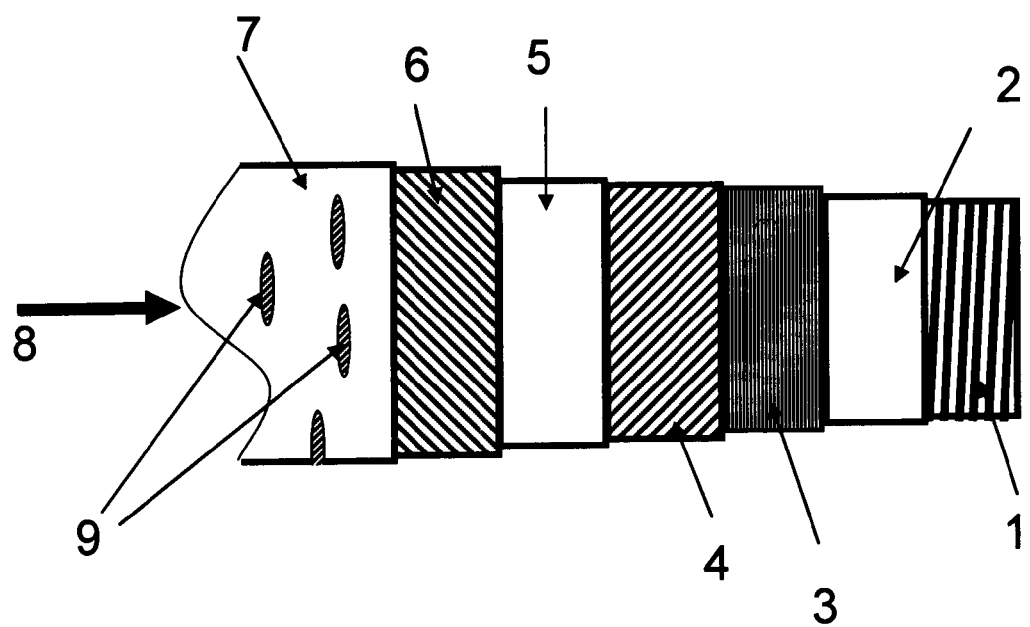
FIG. 1 is a schematic side view of an unbonded flexible pipe of the invention comprising a carcass and a pressure armouring.

The unbonded flexible pipe of the invention shown in FIG. 1 comprises a carcass 1, for example of one or more helically wound reinforcement elements, wound with a angle to the center axis of 80 degrees or more or of annular reinforcement rings optionally held together by connecting elements. Around the carcass 1 an internal sealing sheath 2 is applied. The internal sealing sheath has the function of providing a sealing against outflow of the fluid to be transported in the pipe. The internal sealing sheath 2 may be a single layer structure or a multi-layer. In one embodiment the internal sealing sheath comprises cross linked polyethylene (PEX), polyimide (PA-11, PA 12) PVDF and/or other flour containing polymers.

On the outer side of the internal sealing sheath 2, the unbonded flexible pipe comprises a pressure armor 3 e.g. of one or more helically wound interlocked or non-interlocked elongate reinforcing elements, where the helically wound element(s) for example is wound with an angle to the axis of the pipe which is from about 75 degrees to as close to 90 degrees as possible, such as with an angle to the axis of the pipe which is from about 80 degrees to about 85 degrees. The pressure armor 3 may comprise one or more layers.

On the outer side of the pressure armor 3, the unbonded flexible pipe comprises a pair of cross wound tensile armoring layers 4, 6 separated from each other by a galvanic barrier layer 5. The innermost layer 4 of the cross wound armoring layers 4, 6 is here referred to as the first tensile armoring layer 4 and comprises first helically wound, elongate armoring elements wound in a first winding direction e.g. with an angle of about 55 degrees or less, such as about 45 to about 30 degrees relative to the center axis. The outermost layer 6 of the cross wound armoring layers 4, 6 is here referred to as the second tensile armoring layer 6 and comprises second helically wound, elongate armoring elements wound in a second winding direction e.g. with an angle of about 55 degrees or less, such as about 45 to about 30 degrees relative to the center axis. The first helically wound, elongate armoring elements consist of a first material or a first combination of materials and the second helically wound, elongate armoring elements consist of a second material or a second combination of materials, where the first material or the first combination of materials is different from the second material or the second combination of materials.

The first helically wound, elongate armoring elements and the second helically wound, elongate armoring elements are cross wound with respect to each other and the winding angles with respect to the center axis may be of equal size or they may differ from each other. In order to balance the load from a pulling in the unbonded flexible pipe between the tensile armoring layers 4, 6, the winding angle of the first helically wound, elongate armoring elements may for example be different from the winding angle of the second helically wound, elongate armoring elements.

If for example the first helically wound, elongate armoring elements are of steel and the second helically wound, elongate armoring elements are of CFRP, the winding angle of the first helically wound, elongate armoring elements may for example be larger than the winding angle of the second helically wound, elongate armoring elements.

Outside the second tensile armoring layer 6 is an outer protection sheet 7 arranged for providing a mechanical protection. The outer protection sheath is liquid permeable as indicated with perforations 9 and accordingly the galvanic barrier layer provides the outermost sealing barrier sealing against ingress of water into the pipe.

The galvanic barrier layer may be as described above.

Additional not shown anti-wear layers may be arranged between the respective layers and in particular between the pressure armor 3 and the first tensile armoring layer. The arrow 8 indicates the flow of the liquid in the pipe.

The flexible pipe may have fewer or more layers than the pipe shown in FIG. 1, for example the pipe may have additional layers such as an insulation layer, additional protection layers, intermediate layers and other and the pressure armor and/or the outer sheath may e.g. be omitted.

The layers may e.g. be of materials as described above and/or of materials as usually employed in flexible pipes.

Figure 2:
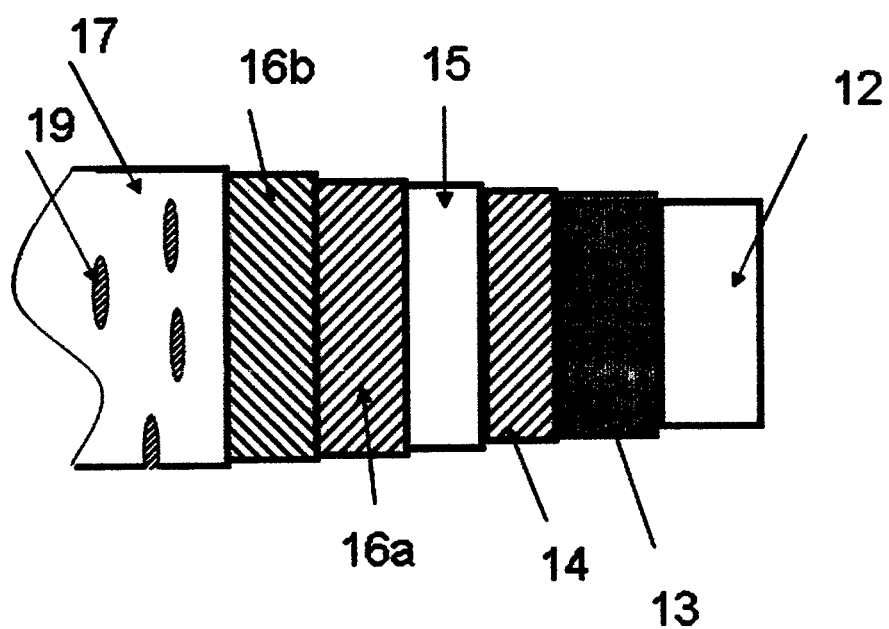
FIG. 2 is a schematic side view of an unbonded flexible pipe of the invention comprising a pressure armouring but not a carcass.

The unbonded flexible pipe of the invention shown in FIG. 2 comprises an internal sealing sheath 12 as its innermost layer. The internal sealing sheath is for example as described above on the outer side of the internal sealing sheath 12, the unbonded flexible pipe comprises a pressure armor 13 e.g. of one or more helically wound interlocked or non-interlocked elongate reinforcing elements as described above.

On the outer side of the pressure armor 13, the unbonded flexible pipe comprises a first tensile armoring layer 14 comprising first helically wound, elongate armoring elements wound in a first winding direction e.g. with an angle of about 55 degrees or less, such as about 45 to about 30 degrees relative to the center axis.

On the outer side of the first tensile armoring layer 14, the unbonded flexible pipe comprises a galvanic barrier layer 15 e.g. as described above and further a pair of cross wound tensile armoring layers 16a, 16b each comprising a plurality of helically wound, elongate armoring elements. The outermost layer 16b of the pair of cross wound tensile armoring layers 16a, 16b outside the galvanic barrier layer 15 is cross wound with respect to the first tensile armoring layer 14 and accordingly this outermost layer 16b is a second tensile armoring layer and the innermost layer 16a of the pair of cross wound tensile armoring layers 16a, 16b outside the galvanic barrier layer 15 which is not cross wound with respect to the first tensile armoring layer 14 (but is wound in the same winding direction as the first tensile armoring layer 14), constitutes an additional tensile armoring layer.

The additional tensile armoring layer 16a may be wound with any winding angle, e.g. equal to or different from the winding angle of the first tensile armoring layer, e.g. such as described above.

Accordingly the first tensile armoring layer 14 and the second tensile armoring layer 16b are separated from each other by the galvanic barrier layer 15.

The second tensile armoring layer 16b comprises second helically wound, elongate armoring elements wound in a second winding direction e.g. with an angle of about 55 degrees or less, such as about 45 to about 30 degrees relative to the center axis. The first helically wound, elongate armoring elements consist of a first material or a first combination of materials and the second helically wound, elongate armoring elements consist of a second material or a second combination of materials, where the first material or the first combination of materials is different from the second material or the second combination of materials e.g. as described above.

Outside the second tensile armoring layer 16b is an outer protection sheet 17 arranged for providing a mechanical protection. The outer protection sheath is liquid permeable as indicated with perforations 19 and accordingly the galvanic barrier layer provides the outermost sealing barrier sealing against ingress of water into the pipe.

Figure 3:
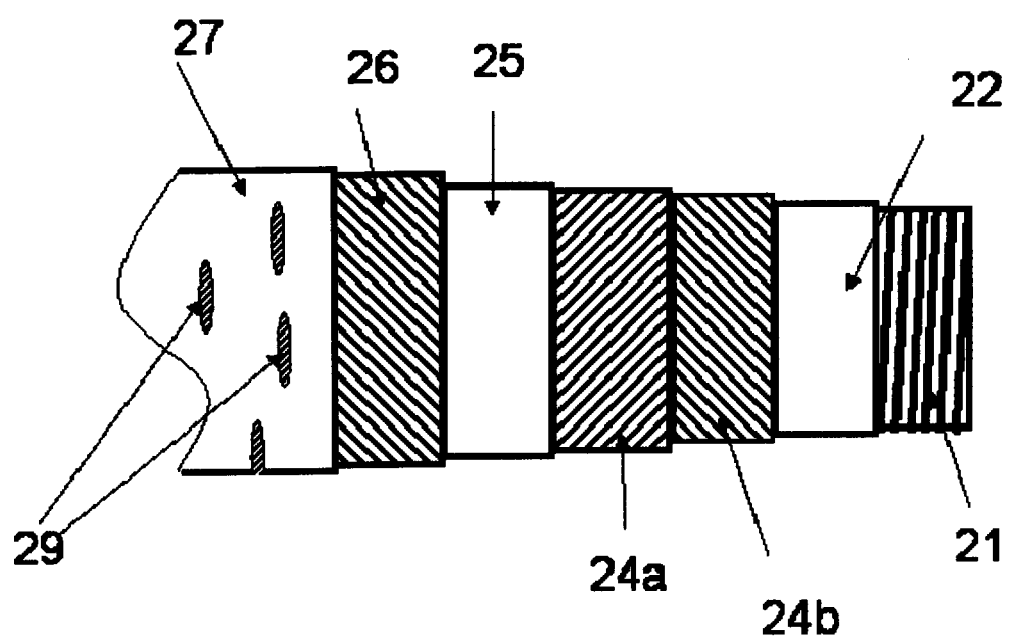
FIG. 3 is a schematic side view of an unbonded flexible pipe of the invention comprising a carcass but not a pressure armouring.

The unbonded flexible pipe of the invention shown in FIG. 3 comprises a carcass 21, for example as described above and as generally known in the art. Around the carcass 21 an internal sealing sheath 22 is applied. The internal sealing sheath is for example as described above.

On the outer side of the internal sealing sheath 22, the unbonded flexible pipe comprises a pair of cross wound tensile armoring layers 24a, 24b each comprising a plurality of helically wound, elongate armoring elements. Outside the pair of cross wound tensile armoring layers 24a, 24b the unbonded flexible pipe comprises a galvanic barrier layer 25 e.g. as described above and outside the galvanic barrier layer 25 the unbonded flexible pipe comprises a second tensile armoring layer 26 comprising second helically wound, elongate armoring elements wound in a second winding direction e.g. with an angle of about 55 degrees or less, such as about 45 to about 30 degrees relative to the center axis.

The outermost layer 24a of the pair of cross wound tensile armoring layers 24a, 24b inside the galvanic barrier layer 25 is cross wound with respect to the second tensile armoring layer 26 and accordingly this outermost layer 24a is a first tensile armoring layer and the innermost layer 24b of the pair of cross wound tensile armoring layers 24a, 24b inside the galvanic barrier layer 25, which is not cross wound with respect to the second tensile armoring layer 26 (but is wound in the same winding direction as the first tensile armoring layer 26), constitutes an additional tensile armoring layer.

Accordingly the first tensile armoring layer 24a and the second tensile armoring layer 26 are separated from each other by the galvanic barrier layer 25.

The first tensile armoring layer 24a comprises first helically wound, elongate armoring elements wound in a second winding direction e.g. with an angle of about 55 degrees or less, such as about 45 to about 30 degrees relative to the center axis. The first helically wound, elongate armoring elements consist of a first material or a first combination of materials and the second helically wound, elongate armoring elements consist of a second material or a second combination of materials, where the first material or the first combination of materials is different from the second material or the second combination of materials e.g. as described above.

Outside the second tensile armoring layer 26 is an outer protection sheet 27 arranged for providing a mechanical protection. The outer protection sheath is liquid permeable as indicated with perforations 29 and accordingly the galvanic barrier layer 25 provides the outermost sealing barrier sealing against ingress of water into the pipe.

Some preferred embodiments have been shown in the foregoing, but it should be stressed that the invention is not limited to these, but may be embodied in other ways within the subject-matter defined in the following claims.

What is claimed is:

1. An unbonded flexible pipe having a length and a center axis along said length, the unbonded flexible pipe comprising an internal sealing sheath surrounding said center axis, and at least a first and a second tensile armor layers comprising cross wound elements surrounding the internal sealing sheath, said first tensile armoring layer is closer to the internal sealing sheath than the second tensile armoring layer and comprises a first tensile armoring layer comprising a plurality of first helically wound, elongate armoring elements, and a second tensile armoring layer comprising a plurality of second helically wound, elongate armoring elements, where the first helically wound, elongate armoring elements consist of a first material or a first combination of materials and the second helically wound, elongate armoring elements consist of a second material or a second combination of materials, where the first material or the first combination of materials is different from the second material or the second combination of materials, said unbonded flexible pipe further comprises a galvanic barrier layer between said first and said second tensile armoring layer and, wherein the galvanic barrier layer is the outermost liquid impermeable layer, so that an outer side of the galvanic barrier layer is wetted with sea water when the pipe is submerged.

2. An unbonded flexible pipe as claimed in claim 1, wherein the galvanic barrier layer is impermeable to liquid for pressure differences over the galvanic barrier layer up to about 10 kPa.

3. An unbonded flexible pipe as claimed in claim 1, wherein the galvanic barrier layer provides a fluid permeation barrier against one or more of the fluids methane, ethane, hydrogen sulphide, carbon dioxide and water, which is at least as high as a fluid permeation barrier against the one or more of the fluids methane, hydrogen sulphides, carbon dioxides and water provided by the internal sealing sheath determined at 50° C. and a pressure difference over the galvanic barrier layer of 1000 kPa.

4. An unbonded flexible pipe as claimed in claim 1, wherein the galvanic barrier layer is essentially impermeable to one or more of the fluids hydrogen sulphide, methane and carbon dioxide, at a partial pressure for the respective fluids on a first side of the layer of 3 kPa or more, the partial pressure of the one or more of the fluids hydrogen sulphides, methane and carbon dioxide being substantially zero on a second side of the layer and the determination is performed at 50° C. and a pressure difference over the galvanic barrier layer of 1000 kPa.

5. An unbonded flexible pipe as claimed in claim 1, wherein the galvanic barrier layer is essentially impermeable to H2O at 50° C. and a pressure difference over the galvanic barrier layer of 1000 kPa.

6. An unbonded flexible pipe as claimed in claim 1, wherein the galvanic barrier layer has a thickness of at least about 0.1 mm.

7. An unbonded flexible pipe as claimed in claim 1, wherein the galvanic barrier layer is an extruded layer comprising one or more of the materials selected from polyolefins; polyamide; polyimide (PI); polyurethanes; polyureas; polyesters; polyacetals; polyethers; polyoxides; polysulfides); polysulphones; polyacrylates; polyethylene terephthalate (PET); polyether-ether-ketones (PEEK); polyvinyls; polyacrylonitrils; polyetherketoneketone (PEKK); copolymers of the preceding; fluorous polymers; compounds comprising one or more of the above mentioned polymers, and/or fiber armed composite materials.

8. An unbonded flexible pipe as claimed in claim 1, wherein the galvanic barrier layer substantially prevents galvanic contact between the first and the second tensile armor layer, the galvanic barrier layer is an extruded layer of a polymer material, having a thickness of about 1 mm or more.

9. An unbonded flexible pipe as claimed in claim 1, wherein said first helically wound, elongate armoring elements and said second helically wound, elongate armoring elements independently of each other has a winding angle of from about 15 degrees to about 60 degrees relative to said center axis of the pipe.

10. An unbonded flexible pipe as claimed in claim 1, wherein first helically wound, elongate armoring elements comprise or consisting of metal.

11. An unbonded flexible pipe as claimed in claim 1, wherein said first helically wound, elongate armoring elements comprise or consist of fiber armed composite material.

12. An unbonded flexible pipe as claimed in claim 1, wherein said first tensile armor layer is in the form of elongate elements of metal with in between elongate elements of an elastic material.

13. An unbonded flexible pipe as claimed in claim 1, wherein said second helically wound, elongate armoring elements comprise or consisting of metal.

14. An unbonded flexible pipe as claimed in claim 1, wherein said second helically wound, elongate armoring elements comprise or consisting of fiber armed composite material.

15. An unbonded flexible pipe as claimed in claim 1, wherein said first second armor layer is are in the form of elongate elements of metal with in between elongate elements of an elastic material.

16. An unbonded flexible pipe as claimed in claim 1, wherein the first helically wound, elongate armoring elements and the second helically wound, elongate armoring elements are cross wound with respect to each other with no additional tensile armoring layer in between.

17. An unbonded flexible pipe as claimed in claim 1, wherein an additional tensile armoring layer is arranged between the first tensile armoring layer and the second tensile armoring layer such that the additional tensile armoring layer comprises elongate armoring elements with a winding angle with respect to the center axis which is cross wound with the first helically wound, elongate armoring elements or the second helically wound, elongate armoring elements.

18. An unbonded flexible pipe as claimed in claim 1, wherein the first helically wound, elongate armoring elements have a first galvanic potential and the second helically wound, elongate armoring elements have a second galvanic potential, wherein the first galvanic potential is different from said second galvanic potential, the galvanic potentials being determined in standard seawater with a chlorinity of between 19.30 and 19.50 grams per kilogram at about 20° C. and substantially no turbulence.

19. An unbonded flexible pipe as claimed in claim 18, wherein absolute difference between the first galvanic potential and the second galvanic potential is at least about 0.25 V, determined in standard seawater with a chlorinity of between 19.30 and 19.50 grams per kilogram at about 20° C.

20. An unbonded flexible pipe as claimed in claim 18, wherein the second galvanic potential is higher than the first galvanic potential.

21. An unbonded flexible pipe as claimed in claim 1, wherein the first helically wound, elongate armoring elements have a different resistance to hydrogen cracking than the second helically wound, elongate armoring elements.

22. An unbonded flexible pipe as claimed in claim 21, wherein the first helically wound, elongate armoring elements have a higher resistance to hydrogen cracking than the second helically wound, elongate armoring elements.

23. An unbonded flexible pipe as claimed in claim 1, wherein the first helically wound, elongate armoring elements have a first ultimate tensile strength the second helically wound, elongate armoring elements have a second ultimate tensile strength, the second ultimate tensile strength is exceeding the first ultimate tensile strength.

24. An unbonded flexible pipe as claimed in claim 1, wherein at least one of the first helically wound, elongate armoring elements and/or at least one of the second helically wound, elongate armoring elements comprise a plurality of cords of fibers.

25. An unbonded flexible pipe as claimed in claim 24, wherein the plurality of cords of fibers are held together by a cured polymer.

26. An unbonded flexible pipe as claimed in claim 1, wherein at least one of the first helically wound, elongate armoring elements and/or at least one of the second helically wound, elongate armoring elements is in the form of a plurality of strength imparting layers held together by a cured polymer.

27. An unbonded flexible pipe as claimed in claim 1, wherein at least one of the first helically wound, elongate armoring elements and/or at least one of the second helically wound, elongate armoring elements is in the form of a plurality of strength imparting layers bonded to each other with a thermoplastic polymer or a polymer that has been cross-linked after winding to form the tensile armouring layer(s).

28. An unbonded flexible pipe as claimed in claim 1, wherein said unbonded flexible pipe further comprises at least one anti wear layer arranged between said first and said second tensile armor layers.

* * * * *

UNITED STATES PATENT AND TRADEMARK OFFICE
CERTIFICATE OF CORRECTION

| | | |
|---|---|---|
| PATENT NO. | : 8,960,239 B2 | Page 1 of 1 |
| APPLICATION NO. | : 13/809704 | |
| DATED | : February 24, 2015 | |
| INVENTOR(S) | : Kristian Glejbol | |

It is certified that error appears in the above-identified patent and that said Letters Patent is hereby corrected as shown below:

In the claims,

Column 17, claim 19, line 24 please add -- an -- between "wherein" and "absolute"

Signed and Sealed this
Twenty-eighth Day of July, 2015

Michelle K. Lee
*Director of the United States Patent and Trademark Office*